UNITED STATES PATENT OFFICE.

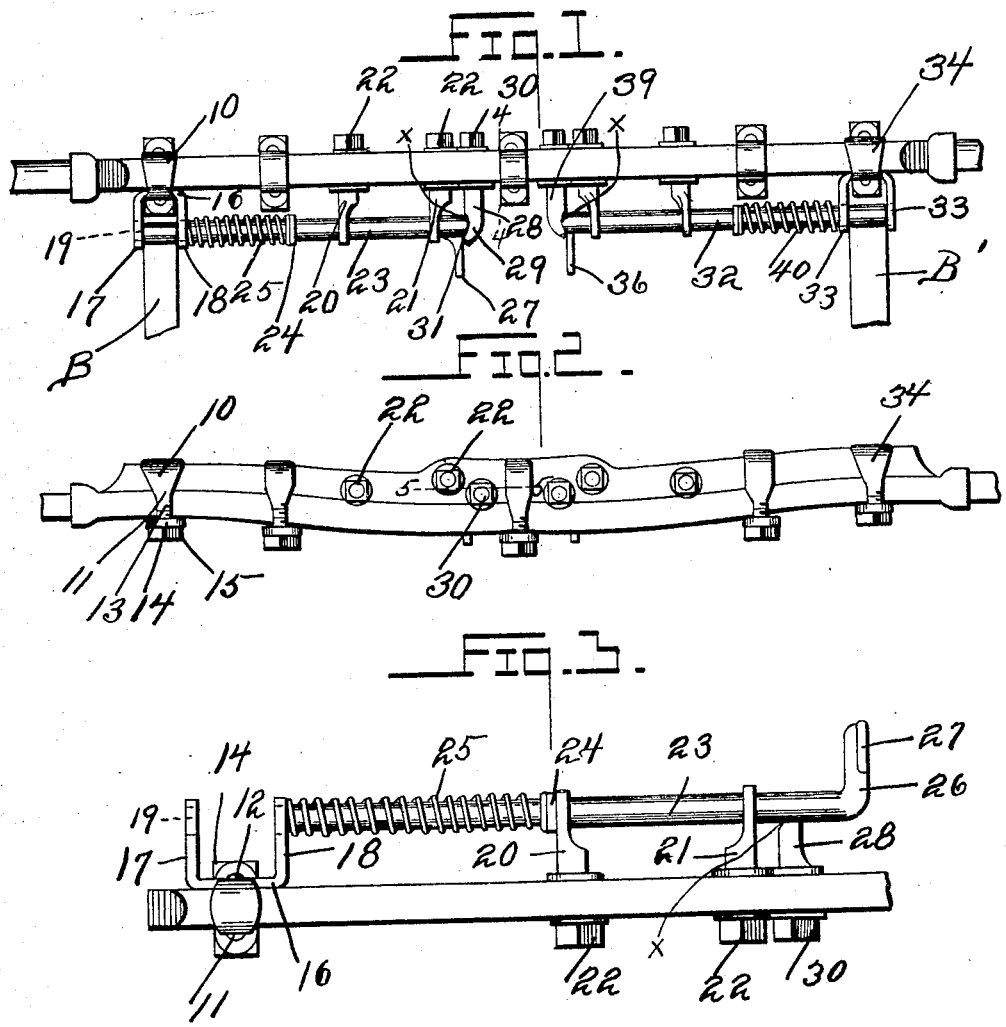

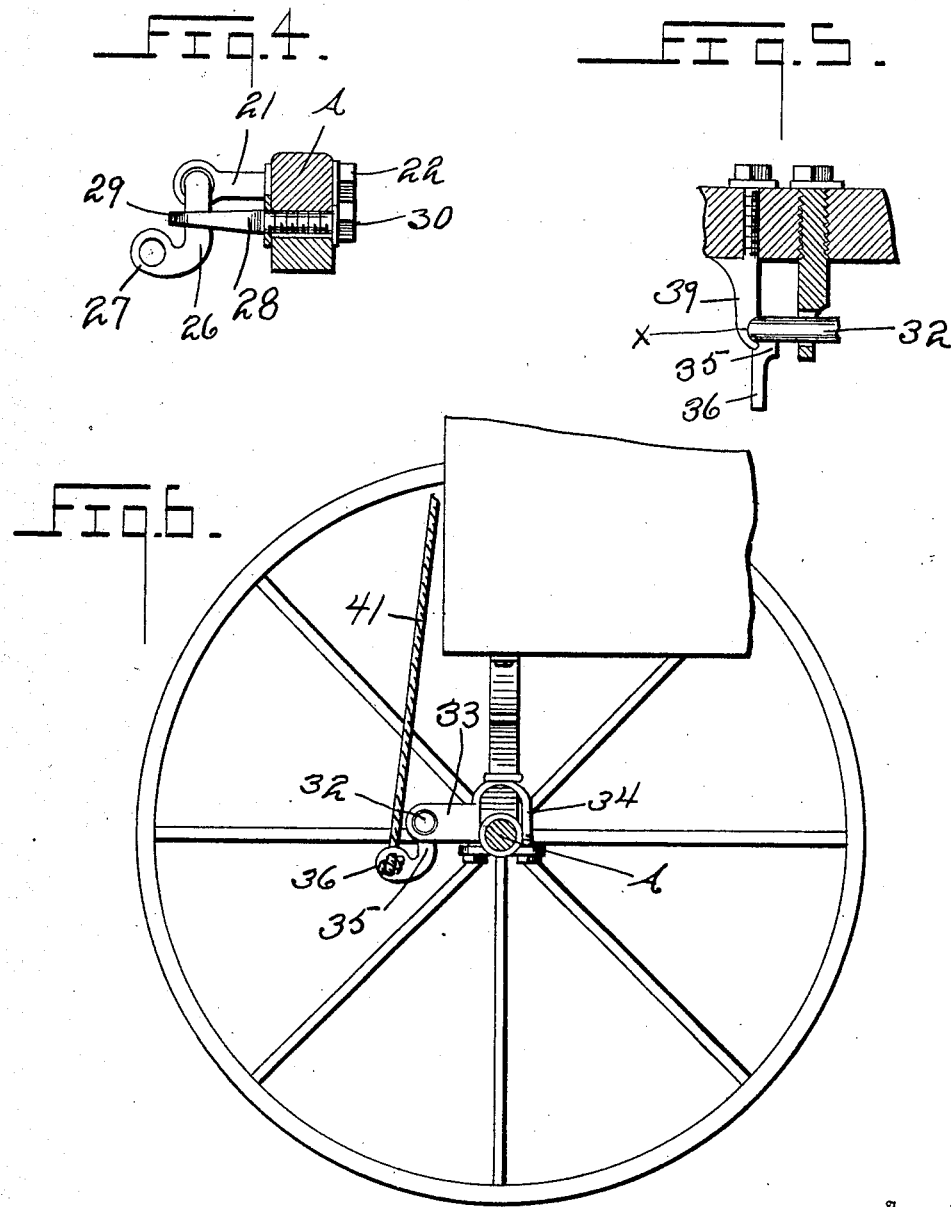

JOHN A. McCALLUM AND JOHN R. BELL, OF CALVIN, NORTH DAKOTA.

HORSE-RELEASER.

No. 916,579.   Specification of Letters Patent.   Patented March 30, 1909.

Application filed July 23, 1908. Serial No. 444,994.

*To all whom it may concern:*

Be it known that we, JOHN A. McCALLUM and JOHN R. BELL, subjects of the King of England, residing at Calvin, in the county of Cavalier and State of North Dakota, have invented certain new and useful Improvements in Horse-Releasers, of which the following is a specification.

This invention relates to the class of carriages and wagons, and more particularly to horse releasing devices, and has for an object to provide a device of this character which may be conveniently applied to axles of ordinary construction and which will embody means whereby the shaft of the vehicle may be immediately released from the axle.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top plan view of the front axle of a vehicle showing the application of the present invention thereto, Fig. 2 is a rear elevation, Fig. 3 is a detail view showing one of the pole retaining members in its released position, Fig. 4 is a transverse sectional view on the line 4—4 of Fig. 1, Fig. 5 is a detail horizontal sectional view on the line 5—5 of Fig. 2, Fig. 6 is a side elevational view of a portion of a vehicle showing the application of the present invention to its front axle.

Referring now more particularly to the drawings, there is shown a portion of a vehicle axle A of ordinary construction.

Adjacent to one end, the axle is provided with a metallic clip 10 of U form and comprising depending leg members 11 and 12 respectively disposed at both sides of the axle, and these leg members, at their lower ends, are threaded as shown at 13. The leg members thus receive a washer plate 14 disposed beneath the axle, and held in place by means of nuts 15 engaged with the threaded ends of the leg members. The clip, at its front side is provided with an enlarged portion 16 which carries forwardly directed ears 17 and 18 respectively each being provided with a horizontally disposed passage 19, for a purpose to be hereinafter described.

The axle, inwardly of the just described clip is provided with eye bolts 20 and 21 respectively having reduced stems engaged in passages formed in the axle and which receive clamping nuts 22. The ears of the clip 10 are thus arranged to receive one member B of a pair of shafts, as shown in Fig. 1 of the drawings. The passages formed in the ears 17 and 18 thus receive the outer end of a sliding member 23 which is also engaged with the shaft, as shown. The eye bolts 20 and 21 respectively are also arranged to receive the sliding member 23 as will be readily understood. The member 23 is provided with a flanged portion 24 which receives one end of a coil spring 25, the other end of the spring being arranged to bear against the ear 17 of the clip 10. At the inner end, the member 23 is provided with a downwardly directed portion 26, and at the lower end this portion 26 is provided with a forwardly directed eye member 27. A latch member 28 is carried by the axle A and is provided with a rearwardly directed reduced stem 29 disposed in a passage formed in the axle, and which is threaded to receive a clamping nut 30. The latch member, adjacent to its forward end is provided with a vertically disposed depression 31 arranged to receive the portion 26 of the member 23. The latch member 28 is thus arranged to normally hold the member 23 against the tension of the spring 25 whereby the outer end of the member 23 is normally engaged with the shaft member.

The axle opposite to the end just described is provided with a sliding member 32 identical to the member 23. The member 32 is connected in a manner identical to that of the member 23, and the outer end of this member is normally disposed in passages formed in the ears 33 of a clip 34. The member 32 is provided with a depending portion 35, and at the lower end this portion is provided with a forwardly directed eye member 36. The portion 35 is engaged with a latch member 39 identical to the member 28. The latch member 39 is thus arranged to hold the member 32 against the tension of the spring 40 carried by said member. The eye members 27 and 36 respectively thus receive the ends of a flexible connection 41 which may be connected with the vehicle in any suitable manner for operation by the driver. The latch members are recessed as shown at X to receive the portions 26 and 35, as shown in Fig. 1. It will thus be seen that the ears 33 of the clip 34 receive the other member B' of the shafts previously described.

In use, should it be desired to release a horse from the vehicle a pull upon the flexible connections will elevate the portions 26 and 35 respectively of the members 23 and 32 respectively whereby they may be released from the latch members 28 and 39, whereupon, by means of the springs 25 and 40 respectively the members 23 and 32 respectively will be disengaged from the end of the shaft.

What is claimed is:—

1. The combination with an axle member, of clips engaged with the axle member, forwardly extending spaced ears carried by the clips, forwardly extending eye bolts engaged in the axle between the clips, a shaft slidably engaged in each pair of ears and in the adjacent eye bolts for movement into and out of position to extend across the space between the ears, said ears being arranged for the engagement of shafts therebetween, a spring for each of the sliding shafts and arranged to hold the said shafts out of position to extend across the space between the ears, a downwardly directed member carried by the inner end of each of the sliding shafts, a forwardly directed eye member carried by the lower end of each of the downwardly directed members, a latch member for each of the sliding shafts, said latch members being located in position to receive the downwardly extending members of the shaft thereagainst to hold the sliding shafts against the action of the springs, and means connected with the eye members for movement thereof to rotate the sliding shafts to bring the downwardly extending members of the shafts out of engagement with the latch members 2. The combination with an axle member, of clips engaged with the axle member, forwardly extending spaced ears carried by the clips, forwardly extending eye bolts engaged in the axle between the clips, a shaft slidably engaged in each pair of ears and in the adjacent eye bolts for movement into and out of position to extend across the space between the ears, said ears being arranged for the engagement of shafts therebetween, a spring for each of the sliding shafts and arranged to hold the said shafts out of position to extend across the space between the ears, a downwardly directed member carried by the inner end of each of the sliding shafts, a forwardly directed eye member carried by the lower end of each of the downwardly directed members, a latch member for each of the sliding shafts, said latch members being located in position to receive the downwardly extending members of the shaft thereagainst to hold the sliding shafts against the action of the springs, and means connected with the eye members for movement thereof to rotate the sliding shafts to bring the downwardly extending members of the shaft out of engagement with the latch members, said latch members being recessed to receive the downwardly extending members of the sliding shafts.

In testimony whereof we affix our signatures, in presence of two witnesses.

JOHN A. McCALLUM.
JOHN R. BELL.

Witnesses:
ARCHIE SILLERS, Jr.,
DEIDRICH DE VRIES.